United States Patent [19]
Parrish

[11] 3,881,565
[45] May 6, 1975

[54] TAG AXLE EMERGENCY TRACTION DEVICE

[76] Inventor: Lloyd Parrish, 1036 Ash St., Deerfield, Ill. 60015

[22] Filed: Jan. 7, 1974

[21] Appl. No.: 431,074

[52] U.S. Cl. .............. 180/24.12; 74/230.12; 180/74
[51] Int. Cl. ........................................... B62d 61/10
[58] Field of Search .......... 180/24.12, 14 E, 15, 16, 180/33 D, 74, 1 C; 74/13, 230.12; 301/41 R, 43, 44 R

[56] References Cited
UNITED STATES PATENTS

| | | | |
|---|---|---|---|
| 2,954,836 | 10/1960 | Cavanaugh | 180/74 |
| 3,014,547 | 12/1961 | Vanderlely | 301/41 R |
| 3,447,622 | 6/1969 | Ovshinsky et al. | 180/24.12 |
| 3,596,728 | 8/1971 | Neville | 180/24.12 |
| 3,724,581 | 4/1973 | Terrell | 180/24.12 |
| 3,788,420 | 1/1974 | Lacroix | 180/74 |

*Primary Examiner*—David Schonberg
*Assistant Examiner*—John P. Silverstrim

[57] ABSTRACT

An axle emergency traction device intended for use on truck vehicles and the like having a pair of drive wheels with a pair of load carrying idle wheels disposed in tandem therebehind, the emergency axle being disposed intermediate said drive and idle wheels and mounted for vertical reciprocal movement therebetween and having at each outer end thereof a drum, each drum adapted to frictionally engage the adjacent drive and idle wheels by frictionally engaging the tread portions thereof upon the axle being moved in a vertical upward direction to engage the drums with the wheels in a manner to transmit drive motion from the drive wheel to the adjacent idle wheel, a guide assembly for guiding the reciprocal vertical movement of the emergency axle, and an air operated hydraulic cylinder and piston arrangement operable from a control switch located in the drive cap of the vehicle and connected to the emergency axle in a manner to effect the positioning of the emergency axle relative to the drive and idle wheels between an operative position in engagement with the wheels and an inoperative position spaced apart from the wheels.

7 Claims, 10 Drawing Figures

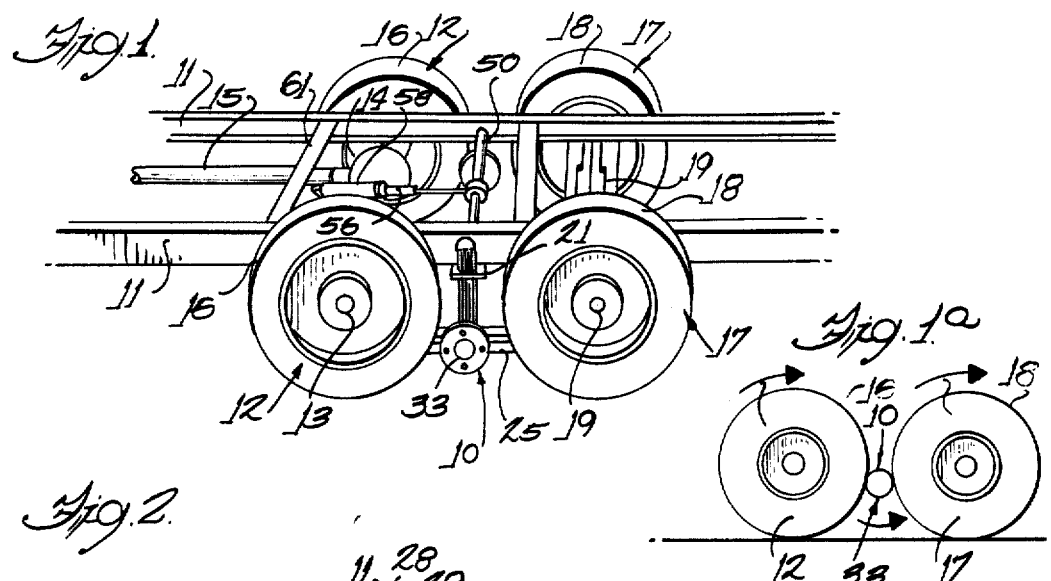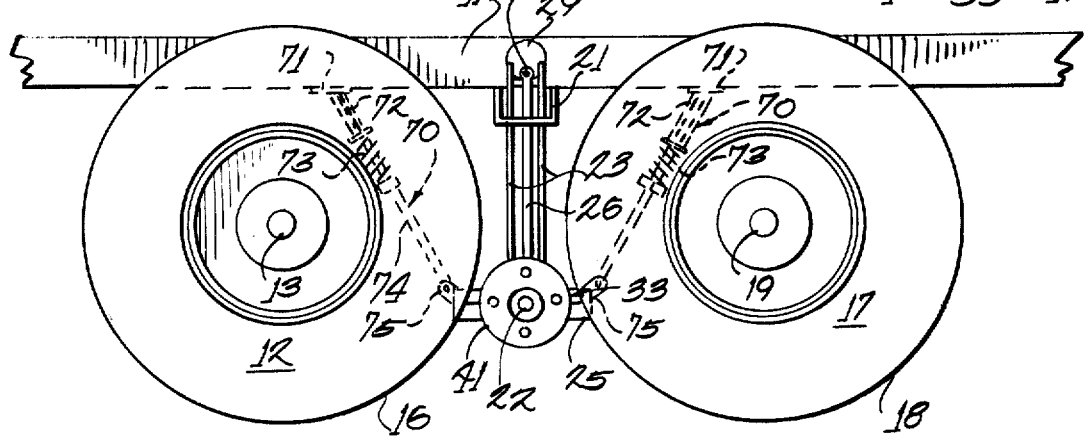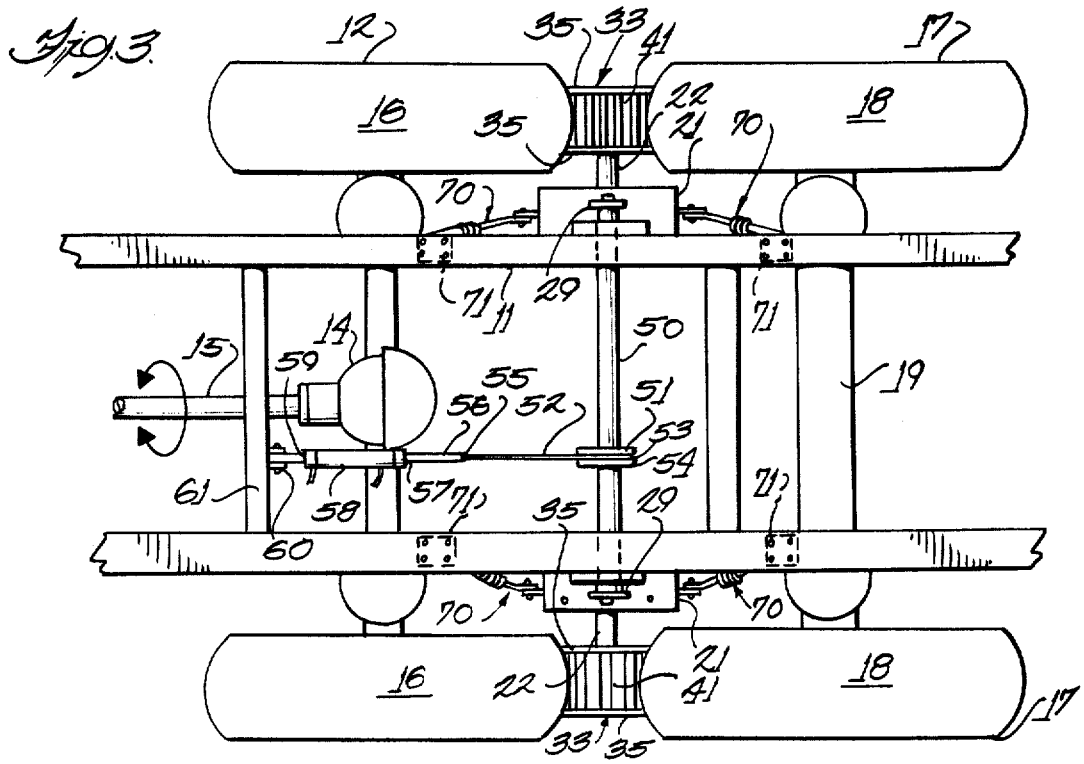

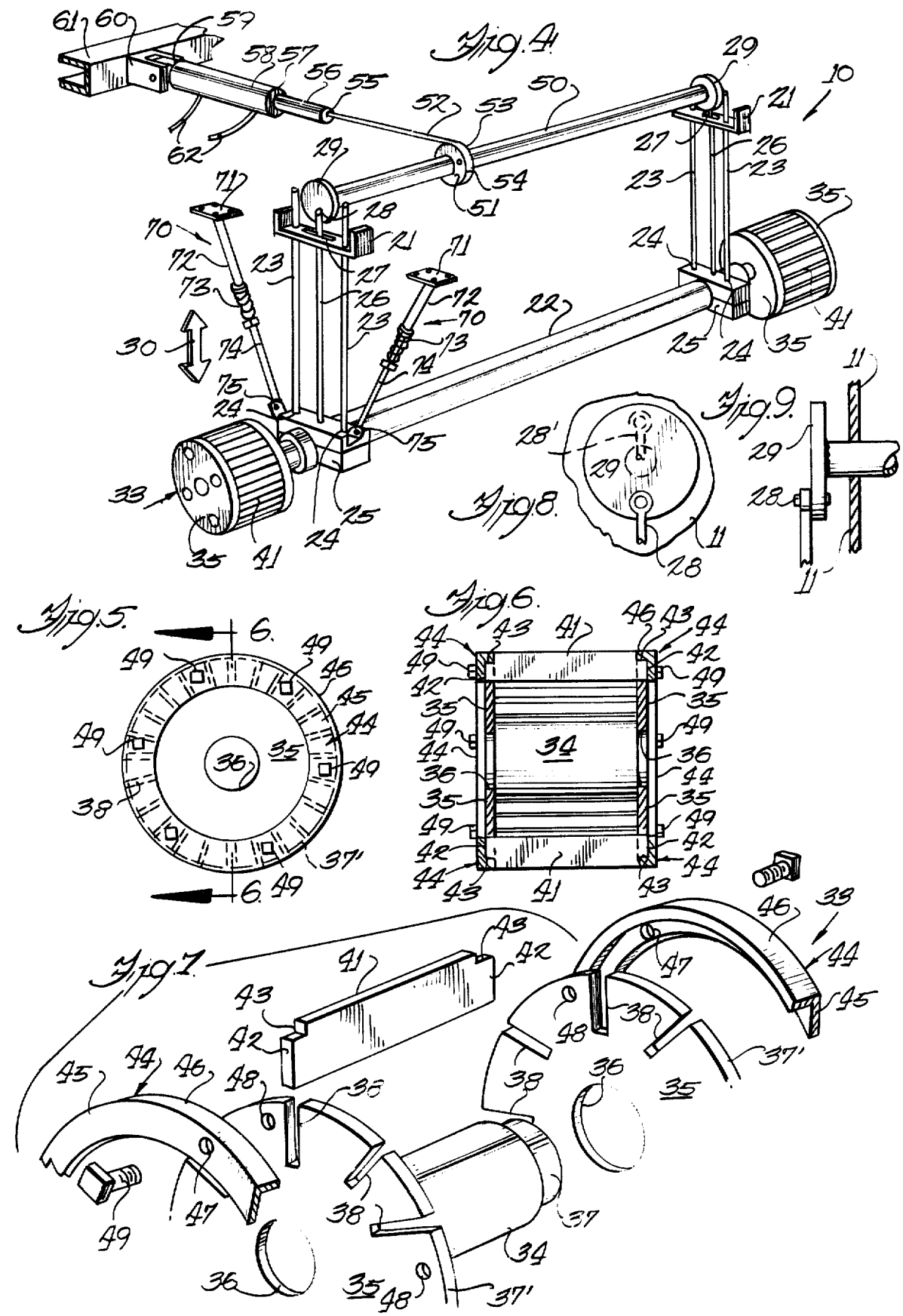

TAG AXLE EMERGENCY TRACTION DEVICE

BACKGROUND OF THE INVENTION

1. Field of the Invention

This invention relates generally to drive devices and more particularly to a novel emergency axle traction device intended for use on truck like vehicles having a pair of idle wheels mounted in tandem relative to a pair of vehicle drive wheels with the device adapted to selectively drive the idle wheels from the drive wheels when desired by the vehicle driver to provide increased traction to the vehicle.

2. Description of the Prior Art

Due to costs and normal requirements, a normal truck type vehicle is normally provided with a pair of drive wheels which are connected by suitable transmission means to the vehicle engine, and due to the loading on the tires for the load to be carried by the vehicle, the vehicle is normally provided with a pair of idle wheels disposed in tandem with the drive wheels and which are rotatably journaled relative to the vehicle frame for the carrying of the load on the vehicle. In some cases, such as when the vehicle is stuck in mud or making its way through ice, snow, or the like, it is desirable to provide an increased traction for the drive of the vehicle, with some vehicles taking this into consideration by providing a drive transmission for a pair of the idle wheels which may be engaged to the vehicle engine such that the engine will drive both the normal drive wheels as well as the transmission connected idle wheels over the short period during which increased traction is required. However, this provision of selective drive of the idle wheels for increased traction is exceptionally expensive and requires a high level of maintenance and repair such that the same is normally not provided on a vehicle and may only normally be obtained if ordered as an option to the vehicle with the associated high costs thereof.

As such increased traction is only normally required under unusual circumstances, such as in mud, soft dirt, snow, ice and the like, and in view of the high cost of the optional drive idle wheels for increased traction, it would be desirable to provide a device capable of driving the idle wheels when desired for increased traction with such device being inexpensive to produce and manufacture so that the same may be purchased and installed at a minimum expense on a vehicle, and with such device requiring little repair and maintenance such that it may go for long periods of time without use and yet be readily available in times of emergency for use.

SUMMARY OF THE INVENTION

The present invention recognizes the advantage of having a drive connection for the idle wheels and also recognizes the disadvantage thereof as to the initial cost and the continuous cost of repair and maintenance thereof, and provides a novel solution for driving the idle wheels of a vehicle when increased traction is required, the novel solution being in the form of an emergency axle disposed intermediate the tandemly mounted drive and idle wheels and having a drum rotatably journaled at opposite ends thereof, the drums adapted to be moved into engagement with the respective tread portions of the adjacent drive and idle wheels to frictionally engage the same and thus transmit rotative drive movement from the drive wheel to the idle wheel to provide an increased driving traction to the vehicle.

It is a feature of the present invention to provide an inexpensive and relatively easily manufactured emergency drive axle to provide increased traction to a vehicle when required.

A further feature of the present invention provides a novel emergency traction axle which is relatively inexpensive to manufacture due to its simplicity of construction, and which is rugged and durable and which therefore may be guaranteed by the manufacturer to withstand many years of usage.

Yet still a further feature of the present invention provides an emergency axle traction device to provide driving power to the idle wheels directly from the drive wheels and which is easy to use and reliable and efficient in operation and requiring a minimum of upkeep, maintenance and repair.

Yet still a further feature of the present invention provides an emergency traction device for selectively driving the idle wheels from the drive wheels and which may, in its entirety, be manufactured and installed as part of the original equipment of the vehicle, or which may be readily attached to the vehicle later as an accessory item at a minimum of expense and requiring a minimum of installation effort and time.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of a vehicle frame having tandemly mounted drive and idle wheels and illustrating the emergency axle of the present invention mounted therebetween in an inoperative position;

FIG. 1A is a diagrammatic front elevational view illustrating the emergency axle in an operative position;

FIG. 2 is a front elevational view of the drive and idle wheels with the emergency axle disposed therebetween in an inoperative position;

FIG. 3 is a top plan view of FIG. 2;

FIG. 4 is a perspective diagrammatic view of the emergency axle assembly and the components thereof as they would be mounted to the truck vehicle frame;

FIG. 5 is a front elevational view of the drum;

FIG. 6 is a cross-sectional view of the drum taken along Line 6—6 of FIG. 5;

FIG. 7 is an enlarged fragmentary exploded perspective view of the details of the drum;

FIG. 8 is a fragmentary front elevational view of the control disc having the control rod mounted thereon; and FIG. 9 is a fragmentary side elevational view of the control disc and control rod of FIG. 8.

DESCRIPTION OF THE PREFERRED EMBODIMENT

Referring now to the drawings there is illustrated a preferred form of an emergency axle traction device constructed in accordance with the principles of the present invention and designated generally in its entirety by the reference numeral 10 and which is intended for mounting on a truck type vehicle or the like having a frame 11 supporting a pair of drive wheels 12 which are interconnected by an axle 13 which is drivingly rotated through a transmission 14 which is connected by a drive shaft 15 to the vehicle engine (not shown) in a manner to impart a driving rotative movement to the driving wheels 12 in a conventional manner. The wheels 12 are provided with tread portions 16. To assist in carrying the load of the vehicle, as provided on conventional type vehicles of the truck type, there are provided a pair of idle wheels 17 having tread portions 18 and which are supported for free rotation relative to frame 11 by an axle 19 extending therebetween and supported on the frame. The idle wheels 17 are mounted in tandem relationship to drive wheels 12 such that tread portions 18 are in alignment with tread portions 16.

Disposed intermediate drive wheels 12 and idle wheels 17 is the emergency axle traction device 10 which includes a pair of support and guide brackets 21 each secured adjacent a respective side rail 11 of the vehicle frame, a transversely extending axle 22 mounted for vertical reciprocal movement relative to brackets 21 and guided in such movement by a pair of vertically extending horizontally spaced apart rod like members 23 associated with each bracket 21 and extending downwardly therefrom to pass through associated openings 24 provided adjacent opposite ends of bearing block 25 which support the opposite end portions of the axle 22. A pair of control rods 26 each have one end connected to an associated bearing block 25 and each is then directed upwardly therefrom to pass through a slot 27 in the adjacent bracket 21 to be pivotally attached by a horizontal pivot pin 28 to a point spaced radially from the center of an associated control disc 29, with the pair of control discs 29 each being permanently affixed substantially concentric with opposite ends of control shaft 50 which extends transversely of the frame of the truck vehicle between the side rails 11 and substantially parallel to the axis of the axle 22. Rotation of control shaft 50 in opposite directions about its axis effects the vertical reciprocal movement of the axle 22 in the direction of arrow 30 in a manner to selectively raise and lower the axle relative to the wheels 12 and 17. In this manner the axle 22 moves up and down along guide rods 23 relative to brackets 21.

Journaled for rotation at each end of the drive shaft 22 is a drum 33 having a hub 34 which is journaled for rotation on the end of axle 22. Each drum 33 is formed by a pair of substantially flat disc members 35 having centrally disposed openings 36 therein which fit over reduced diameter portions 37 at opposite ends of the hub 34 to form a spool like configuration, the outer circumferal edge 37' of each disc 35 being provided with a plurality of circumferally spaced apart radially inwardly projecting slots 38, the slots of the respective disc members being horizontally aligned and adapted to receive therein substantially flat rectangularly shaped members 41 having opposed ends 42 with each end having a rectangular recess 43 formed in the top corner thereof. Each member 41 is of a length greater than the distance between the exterior surfaces of the discs 35 so as to project outwardly of the exterior surfaces, with a retaining ring like band 44 associated with each disc 35 and disposed exteriorly of each disc, each band 44 having a substantially flat body portion 45 which lies in juxtaposition with the exterior face surface of each associated disc 35, with each band having an annular outwardly projecting flange portion 46 which projects outwardly from the body portion in a manner to engage the recesses 43 of members 41 so as to retain the members 41 tightly in position in the slots 38 of discs 35. A plurality of apertures 47 are spaced about body member 45 of each disc 44 and are adapted to be aligned with mating interiorly threaded apertures 48 disposed angularly about each disc 35, the aligned apertures adapted to receive therethrough a threaded bolt 49 which passes freely through aperture 47 and is threadedly received in aperture 48 to retain the rings 44 to the discs 35. The bore 36 is rotatably journaled on the associated end of the axle 22 for rotation about its axis relative thereto.

It is to be understood that the diameter of the drum 33 is greater than the horizontal spacing between adjacent tread portions 16 and 18 of the drive and idle wheels respectively, with the inoperative position of the emergency axle traction device being disposed vertically below a horizontal plane extending through the axis of the drive and idle axes 13 and 19, such as seen in FIG. 2.

To effect rotation of control shaft 50 about its axis there is provided thereon intermediate its end portions a circular drive wheel or pulley 51 affixed concentrically with the control shaft and extending radially outwardly therefrom. A flexible cable or drive chain 52 has one end 53 affixed to a circumferal edge 54 of the pulley 51 with the cable being trained about a portion of the circumferal edge to terminate at its opposite end 55 at the projecting end of a piston 56 which is reciprocally mounted for movement along its axis in the front end 57 of an air operated cylinder 58 having its opposite end 59 adapted to be affixed by a bracket 60 to a frame section 61 of the truck vehicle, the frame section preferably extending transversely of the truck vehicle frame between the side rails 11. The cylinder 58 is provided with suitable hosing connections 62 which are connected to a suitable source of pressurized air with a control switch therefor being located in the drive cab of the truck vehicle such that operation of the cylinder in a manner to draw thereinto piston rod 56 effects the rotation of control shaft 50 about its axis for an angle of about 180° thus effecting similar rotation of each control disc 29 which effects the pulling upward by the control disc of each associated control rod 28 from its inoperative position disposed substantially at the bottom of the control disc to an operative position, such as designated by reference numeral 28' at the top of the control disc thus moving axle 22 and associated drums 33 vertically upwards in direction of arrow 30 with the members 41 disposed about the circumference of the drum 33 being brought into engagement with the treads 16 and 18 of the drive and idle wheels 12 and 17 respectively, such as shown diagrammatically in FIG. 1A. In FIG. 1A it is seen that drive wheel 12 rotates in a clockwise direction with the tread 16 thereof engaging the circumference of drum 33 to effect the rotation of the drum in a counter-clockwise direction, the circumference of the drum in turn engaging the tread portion 18 of idle wheel 17 in a manner to effect the rotation of the idle wheel in a clockwise direction. In this manner the drive force is transmitted from the drive wheels 12 to the idle wheels 17 by the emergency axle traction device 10 in a manner to increase the traction of the wheels driving the vehicle.

To disengage the traction device 10 from the wheels 12 and 17, the vehicle driver operates the controls in the driver cab in a manner to force piston rod 56 axially outwardly of cylinder 58 thus permitting the drums 33 to drop vertically away from the wheels to their inoperative position in disengagement from the wheels.

For assistance in mounting the device 10 to the truck vehicle frame there is provided associated with each of bearing blocks 25 a pair of spring assemblies 70 which, as seen in FIG. 4 are shown diagrammatically affixed to one of the bearings blocks 25 with it being understood that a similar pair of springs would also be associated with the opposite bearing block but that the same have not been illustrated at the present time to provide a more clear illustration of the invention in FIG. 4. Each of the spring assemblies 70 includes a plate 71 adapted to be affixed to side rail 11 of the vehicle frame, a rod 72 pivotally attached at one end to plate 71 and projecting downwardly therefrom and having a coil 73 disposed concentrically over the opposite end thereof, a second rod 74 telescopically received in the rod 72 at the projecting free end thereof with the rod 74 projecting outwardly therefrom and pivotally secured by bracket 75 to an adjacent end of the bearing block 25. The tension of spring 73 is adjustable in any of the conventional well known manners, with the rod 74 being adjustable relative to rod 72 thus permitting accurate adjustment of the axle 22 intermediate the wheels 12 and 17 and preventing adverse sway or swinging movement thereof during the normal movement of the vehicle.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

I claim:

1. An emergency axle traction device intended for use on truck like vehicles having a pair of drive wheels mounted on the vehicle frame and connected by suitable transmission means to the vehicle engine, and a pair of idle wheels mounted in tandem relationship relative to the drive wheels in close relationship thereto and supported on the vehicle frame for rotation relative thereto, the drive device intended for selective operation in a manner to effect the selective driving of the idle wheels by the drive wheels, the device comprising:

a pair of horizontally spaced apart supporting brackets adapted to be mounted to opposite portions of a vehicle frame intermediate said drive and idle wheels;

a pair of vertically disposed guide rods mounted on each support bracket and depending vertically downwardly therefrom;

a pair of horizontally spaced apart bearing blocks, each bearing block associated with a pair of guide rods for reciprocal vertical movement in an upwards and downwards movement therealong;

a cylindrical axle extending horizontally between said bearing blocks and projecting outwardly from opposite ends of said bearing blocks, said axle mounted in said bearing blocks for vertical reciprocal movement therewith;

a cylindrically shaped drum member rotatably mounted on each end of said axle for rotatable movement about the axis of said axle, the diameter of said drum being greater than the spacing between the nearest adjacent points of the tread portions of adjacent tandemly disposed drive and idle wheels;

operating means associated with each bearing block to selectively effect the vertical movement of said axle and said associated drums between an operative position where the circumference of said drums frictionally engages the treads of adjacent drive and idle wheels in a manner to effect the driving rotation of said idle wheel, and to an inoperative position where said axle and said drums are disposed below a horizontal plane passing through the axis of said drive and idle wheels; and each of said drum members is of a substantially identical construction, each drum comprising an elongated cylindrical hub member adapted to be received over an associated end of said axle for rotation thereabout, a pair of longitudinally spaced apart substantially flat disc members each associated with one end of the hub and affixed thereto in a manner defining a spool in conjunction with the hub, said disc members being of a circular configuration and having a plurality of circumferally spaced apart radially inwardly extending slots disposed completely about the circumference and opening out of the circumferal edge of each disc, the slots in each disc being in alignment with associated slots in the opposite disc, a plurality of substantially flat rectangularly shaped longitudinally extending members each having opposed end edges with each end edge having a rectangularly shaped recess in a top corner thereof, each of said members having a height and thickness corresponding to the height and thickness of said disc slots so as to be snugly received therein, each of said members having a longitudinal length greater than the spacing between the exterior opposed surfaces of said pair of discs such that the opposite ends of each member project outwardly of the exterior surface of each disc when the member is received in said aligned pair of slots, and a pair of ring shaped retaining members each adapted to be disposed adjacent an exterior surface of an associated disc member and each being of a size and configuration adapted to be received in part in the recess defined in each of said rectangular members projecting exteriorly of said associated disc member so as to retain said members in said slots to define the circumference of said drum.

2. The emergency axle traction device as set forth in claim 1 wherein each of said ring shaped retaining members is comprised of an annular ring of a generally L-shaped cross-section, each ring having a body portion with an annular flange portion formed integrally with the top edge of the body portion and projecting outwardly therefrom, the body portion adapted to overlie in juxtaposition a portion of the exterior surface of each disc member, the flange portion adapted to be engaged in said recess portion of each of said rectangular members, and means adapted for securing each of said ring members to said disc members.

3. The emergency axle traction device as set forth in claim 2 wherein said means adapted for retaining said retaining member rings to said disc members is comprised of a plurality of angularly spaced apart apertures provided in each of said ring body members and extending therethrough, a like number of angularly spaced apart apertures disposed in said associated disc member with each of said apertures being interiorly threaded with screw threads, said ring apertures adapted to be axially aligned with mating disc apertures, and bolt means having threaded shanks adapted to pass freely through said ring apertures and be threadedly received in said disc apertures for retaining said rings to said disc members.

4. The emergency axle traction device as set forth in claim 3 wherein said means for operating said axle comprises a transverse extending control shaft which extends between said support brackets substantially parallel to the axis of said axle, said control shaft mounted for rotative movement about its longitudinal axis, a pair of control discs, each control disc mounted concentric with an opposite end of said control shaft in a position vertically overlying an associated bearing block, a control rod having one end affixed to said associated bearing block with said control rod projecting vertically upwardly therefrom and having its opposite end pivotally secured to said control disc at a position spaced radially outwardly from the center thereof such that rotation of said control shaft about its axis will effect similar rotation of each of said control discs to effect the movement of each of said control rods in a general vertical manner to effect the vertical raising and lowering of said bearing blocks relative to said support brackets, and powered means adapted to effect the rotative movement of said control shaft.

5. The emergency axle traction device as set forth in claim 4 wherein said powered means is comprised of an air operated cylinder having one end adapted to be affixed to a transversely extending member of said truck vehicle frame with the opposite end projecting outwardly therefrom in a direction substantially normal to the axis of said control shaft, a piston rod having one end telescopically received in the projecting end of said cylinder for reciprocal telescopic movement inwardly and outwardly thereof, and a member interconnecting the end of said piston rod to a point on said control shaft whereby inward movement of said piston rod relative to said cylinder will effect rotative movement of said control shaft in a first direction about its axis, and with outward movement of said piston rod relative to said cylinder providing for rotative movement of said control shaft in the opposite direction about its axis.

6. The emergency axle traction device as set forth in claim 5 further comprising a pulley wheel affixed concentrically to said control shaft intermediate its ends and projecting radially outwardly therefrom and having a peripheral circumferal edge thereabout, and wherein said means interconnecting said piston rod to said control shaft is comprised of a flexible cable having one end affixed to a peripheral edge portion of said pulley wheel with the opposite end affixed to said projecting free end of said piston rod whereby movement of said piston rod will effect rotative movement of said pulley wheel which, in turn, will effect rotative movement of said control shaft on which said pulley wheel is permanently affixed.

7. The emergency axle traction device as set forth in claim 6 further comprising a pair of adjustable spring members associated with each of said bearing blocks, each pair of adjustable spring members having one end affixed to an opposite end of each bearing block with the spring member projecting upwardly and outwardly from the bearing block in a manner to have its opposite end affixed to said truck vehicle frame, each of said spring assemblies being adjustable to provide for the adjustment of said axle intermediate said drive and idle wheels.

* * * * *